(12) United States Patent
Tsukahara et al.

(10) Patent No.: US 10,324,294 B2
(45) Date of Patent: *Jun. 18, 2019

(54) DISPLAY CONTROL DEVICE, DISPLAY CONTROL METHOD, AND COMPUTER PROGRAM

(71) Applicant: SONY CORPORATION, Tokyo (JP)

(72) Inventors: Tsubasa Tsukahara, Tokyo (JP); Jun Kimura, Kanagawa (JP); Nobuhiro Saijo, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/184,409

(22) Filed: Nov. 8, 2018

(65) Prior Publication Data

US 2019/0072769 A1   Mar. 7, 2019

Related U.S. Application Data

(63) Continuation of application No. 15/101,739, filed as application No. PCT/JP2015/053312 on Feb. 5, 2015, now Pat. No. 10,146,057.

(30) Foreign Application Priority Data

Feb. 20, 2014  (JP) .................................. 2014-030945

(51) Int. Cl.
| | |
|---|---|
| *G09G 5/00* | (2006.01) |
| *G02B 27/01* | (2006.01) |
| *G09G 3/00* | (2006.01) |
| *G09G 5/10* | (2006.01) |
| *H04N 5/74* | (2006.01) |
| *G02B 27/02* | (2006.01) |
| *H04N 21/41* | (2011.01) |

(Continued)

(52) U.S. Cl.
CPC ......... *G02B 27/0172* (2013.01); *G02B 27/02* (2013.01); *G09G 3/001* (2013.01);
(Continued)

(58) Field of Classification Search
CPC . G06F 3/14; G09G 3/001; G09G 5/10; G09G 2320/066; G09G 2320/08;
(Continued)

(56) References Cited

U.S. PATENT DOCUMENTS

| | | |
|---|---|---|
| 5,003,300 A | 3/1991 | Wells |
| 5,739,797 A | 4/1998 | Karasawa et al. |

(Continued)

FOREIGN PATENT DOCUMENTS

| | | |
|---|---|---|
| JP | H09-191438 | 7/1997 |
| JP | 2004-109995 A | 4/2004 |

(Continued)

OTHER PUBLICATIONS

Jan. 15, 2019, Japanese Office Action issued for related JP Application No. 2016-504031.

*Primary Examiner* — Vijay Shankar
(74) *Attorney, Agent, or Firm* — Paratus Law Group, PLLC

(57) ABSTRACT

There is provided a display control device capable of ensuring the user's field of vision while keeping the user safe when the user is using a see-through head-mounted display, the display control device including: a situation acquisition unit configured to acquire information about a situation where a see-through display is being used, and a display control unit configured to perform display control on the see-through display using the information acquired by the situation acquisition unit so that a display of the information on the see-through display gradually becomes clearly visible.

16 Claims, 11 Drawing Sheets

(51) Int. Cl.
*G06F 3/14* (2006.01)
*H04N 5/64* (2006.01)

(52) U.S. Cl.
CPC .............. *G09G 5/10* (2013.01); *H04N 5/7491*
(2013.01); *G02B 2027/014* (2013.01); *G02B 2027/0112* (2013.01); *G02B 2027/0118* (2013.01); *G02B 2027/0123* (2013.01); *G02B 2027/0138* (2013.01); *G02B 2027/0141* (2013.01); *G02B 2027/0178* (2013.01); *G06F 3/14* (2013.01); *G09G 2320/066* (2013.01); *G09G 2320/0613* (2013.01); *G09G 2320/0626* (2013.01); *G09G 2320/08* (2013.01); *G09G 2360/144* (2013.01); *H04N 5/64* (2013.01); *H04N 21/4122* (2013.01)

(58) Field of Classification Search
CPC ... G09G 2320/0626; G09G 2320/0613; G09G 2360/144
See application file for complete search history.

(56) References Cited

U.S. PATENT DOCUMENTS

| | | | |
|---|---|---|---|
| 7,542,012 | B2 | 6/2009 | Kato et al. |
| 8,159,417 | B2 | 4/2012 | Nakashima |
| 10,146,057 | B2 * | 12/2018 | Tsukahara et al. |
| 2009/0243967 | A1 | 10/2009 | Kato |
| 2010/0177114 | A1 | 7/2010 | Nakashima |

FOREIGN PATENT DOCUMENTS

| | | |
|---|---|---|
| JP | 2004-219664 A | 8/2004 |
| JP | 2005-138801 A | 6/2005 |
| JP | 2006-171311 A | 6/2006 |
| JP | 2008-004083 A | 1/2008 |
| JP | 2013-257457 A | 12/2013 |
| WO | WO 2005/122128 A1 | 12/2005 |
| WO | WO 2006/064655 A1 | 6/2006 |
| WO | WO 2012/133379 A1 | 10/2012 |

* cited by examiner

DISPLAY CONTROL DEVICE, DISPLAY CONTROL METHOD, AND COMPUTER PROGRAM

CROSS REFERENCE TO PRIOR APPLICATION

This application is a continuation of U.S. patent application Ser. No. 15/101,739 (filed on Jun. 3, 2016), which is a National Stage Patent Application of PCT International Patent Application No. PCT/JP2015/053312 (filed on Feb. 5, 2015) under 35 U.S.C. § 371, which claims priority to Japanese Patent Application No. 2014-030945 (filed on Feb. 20, 2014), which are all hereby incorporated by reference in their entirety.

TECHNICAL FIELD

The present disclosure relates to display control devices, display control methods, and computer programs.

BACKGROUND ART

A display device which is worn on the head and is used to view video, i.e., a head-mounted display (HMD), is well known (see, for example. Patent Literature 1, etc.). A head-mounted display has an optical unit for each of the left and right eyes, and is also used in combination with headphones, and is thereby configured to be capable of controlling visual sensation and auditory sensation. There have recently been advances in techniques for a so-called see-through head-mounted display, which allows the user wearing the display to see a real scene at which the user's line of sight is aimed.

CITATION LIST

Patent Literature

Patent Literature 1: JP 2013-257457A

SUMMARY OF INVENTION

Technical Problem

A see-through head-mounted display continues to be worn by the user during the use of the head-mounted display, so that the display is present in front of the user's eyes. Therefore, notification information which notifies the user of the arrival of a mail call, or the like may be displayed on the display at a timing when the user is not expecting it. If notification information is suddenly displayed on the display, the user's field of vision is partially blocked by the notification information, which is dangerous.

Also, if notification information is caused to flicker or move during the use of a see-through head-mounted display in order to attract the user's attention, the user's attention is attracted by the flickering or movement, which is dangerous. In addition, if any information continues to be displayed in a portion of the field of vie, the user's field of vision is partially blocked by the information, which is dangerous.

With the above in mind, the present disclosure provides a novel and improved display control device, display control method, and computer program which are capable of ensuring the user's field of vision while keeping the user safe when the user is using a see-through head-mounted display.

Solution to Problem

According to the present disclosure, there is provided a display control device including: a situation acquisition unit configured to acquire information about a situation where a see-through display; and a display control unit configured to perform display control on the see-through display using the information acquired by the situation acquisition unit so that a display of the information on the see-through display gradually becomes clearly visible.

According to the present disclosure, there is provided a display control method including: acquiring information about a situation where a see-through display is being used; and performing display control on the see-through display using the acquired information so that a display of the information on the see-through display gradually becomes clearly visible.

According to the present disclosure, there is provided a computer program for causing a computer to execute: acquiring information about a situation where a see-through display is being used; and performing display control on the see-through display using the acquired information so that a display of the information on the see-through display gradually becomes clearly visible.

Advantageous Effects of Invention

As described above, according to the present disclosure, a novel and improved display control device, display control method, and computer program which are capable of ensuring the user's field of vision while keeping the user safe when the user is using a see-through head-mounted display, can be provided.

Note that the effects described above are not necessarily limited, and along with or instead of the effects, any effect that is desired to be introduced in the present specification or other effects that can be expected from the present specification may be exhibited.

DESCRIPTION OF EMBODIMENT(S)

Figure 1:
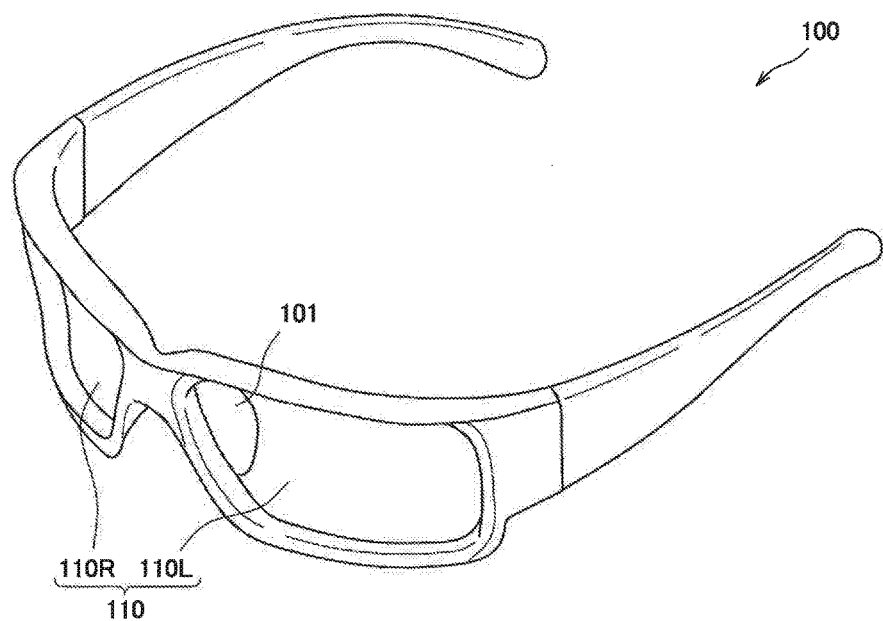
FIG. 1 is an illustrative diagram showing an external appearance example of a head-mounted display 100 according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.
1. Embodiments of the Present Disclosure
1.1. External Appearance Examples of Head-Mounted Display
1.2. Functional Configuration Examples of Head-Mounted Display
1.3. Operation Examples of Head-Mounted Display
2. Conclusion

1. EMBODIMENTS OF THE PRESENT DISCLOSURE

[1.1. External Appearance Examples of Head-Mounted Display]

Firstly, an external appearance example of a head-mounted display according to an embodiment of the present disclosure will be described. FIG. 1 is an illustrative diagram showing an external appearance example of a head-mounted display 100 according to an embodiment of the present disclosure.

As shown in FIG. 1, the head-mounted display 100 is an eyeglasses display device provided with a display unit 110 including a right-eye display unit 110R and a left-eye display unit 110L. The head-mounted display 100 is a so-called see-through head-mounted display, which allows the user to view a screen superimposed on a real-world field of view.

The head-mounted display 100 is configured so that nose pads 101 serve as a sensor for determining whether the display is worn, by detecting the touch of the user's (viewer's) nose tip on the nose pads.

The display unit 110 may include, for example, an organic EL display. The display unit 110 is controlled so that the display of the display unit 110 is switched between a mode in which an image is not displayed (see-through mode), a mode in which an image is displayed and superimposed on the user's read-world field of view (image display mode), and a mode in which an image is displayed on only one of the two display units (single-eye display mode).

The head-mounted display 100 receives an image signal, by wire or wirelessly, from an external device (a personal computer, a smartphone, a tablet-type mobile terminal, etc.), and displays an image on the display unit 110 on the basis of the received image signal.

Figure 2:
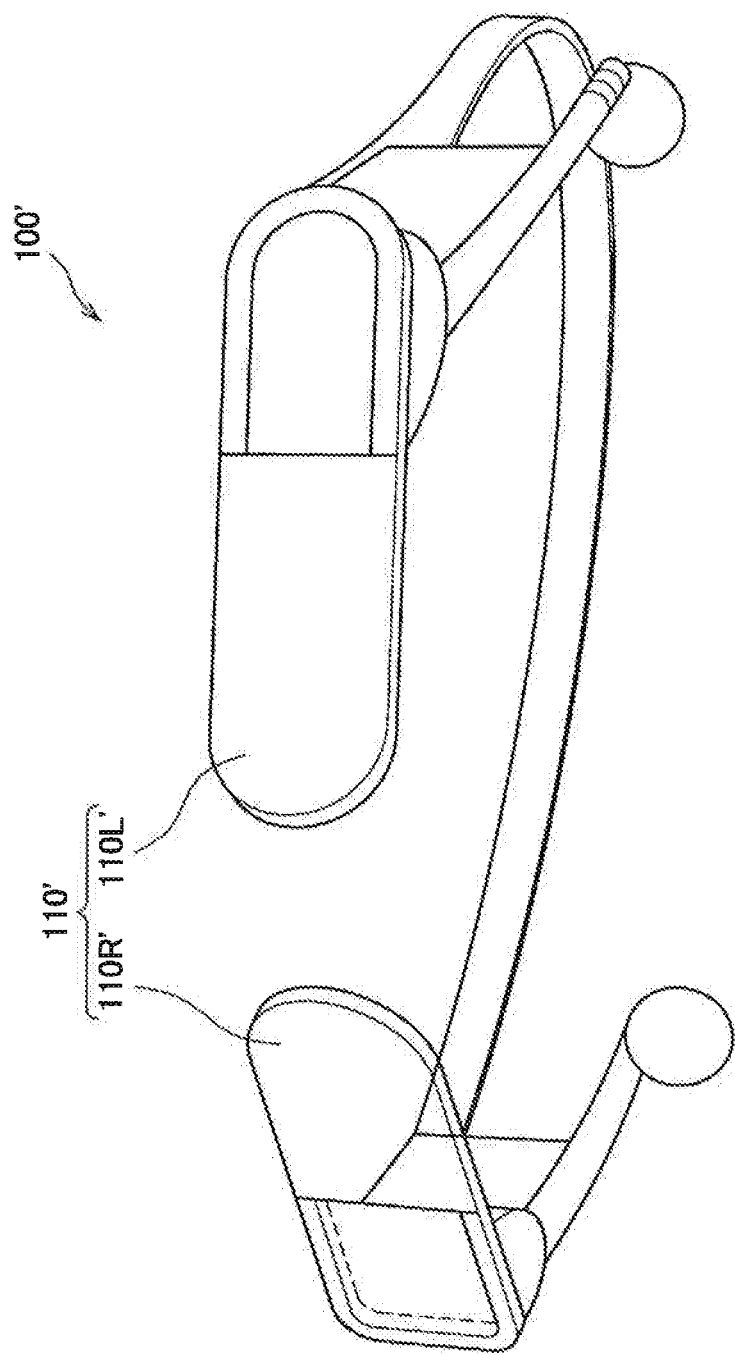
FIG. 2 is an illustrative diagram showing an external appearance example of a head-mounted display 100 according to an embodiment of the present disclosure.

In the foregoing, an external appearance example of the head-mounted display 100 according to an embodiment of the present disclosure has been described with reference to FIG. 1. Next, another external appearance example of the head-mounted display will be described. FIG. 2 is an illustrative diagram showing an external appearance example of a head-mounted display 100' according to an embodiment of the present disclosure.

As shown in FIG. 2, the head-mounted display 100' is an eyeglasses display device which includes a mounting unit having a frame structure which extends across half the circumference of the head from one of both the sides of the head to the other through the back of the head. The head-mounted display 100' is provided with a display unit 110' including a right-eye the display unit 110R' and a left-eye the display unit 110L'.

The head-mounted display 100 shown in FIG. 1 and the head-mounted display 100' shown in FIG. 2 can allow the user to view a screen superimposed on the read-world field of view. However, as described above, the see-through head-mounted display continues to be worn by the user during the use of the head-mounted display, so that the display is present in front of the user's eyes. Therefore, notification information which notifies the user of the arrival of a mail, call, or the like may be displayed on the display at a timing when the user is not expecting it. If notification information is suddenly displayed on the display, the user's field of vision is partially blocked by the notification information, which is dangerous.

Also, if notification information is caused to flicker or move during the use of the see-through head-mounted display in order to attract the user's attention, the user's attention is attracted by the flickering or movement, which is dangerous. In addition, if any information continues to be displayed in a portion of the field of view, the user's field of vision is partially blocked by the information, which is dangerous.

With the above in mind, in an embodiment of the present disclosure, a head-mounted display for ensuring the user's field of vision while keeping the user safe will be described.

[1.2. Functional Configuration Examples of Head-Mounted Display]

Figure 3:
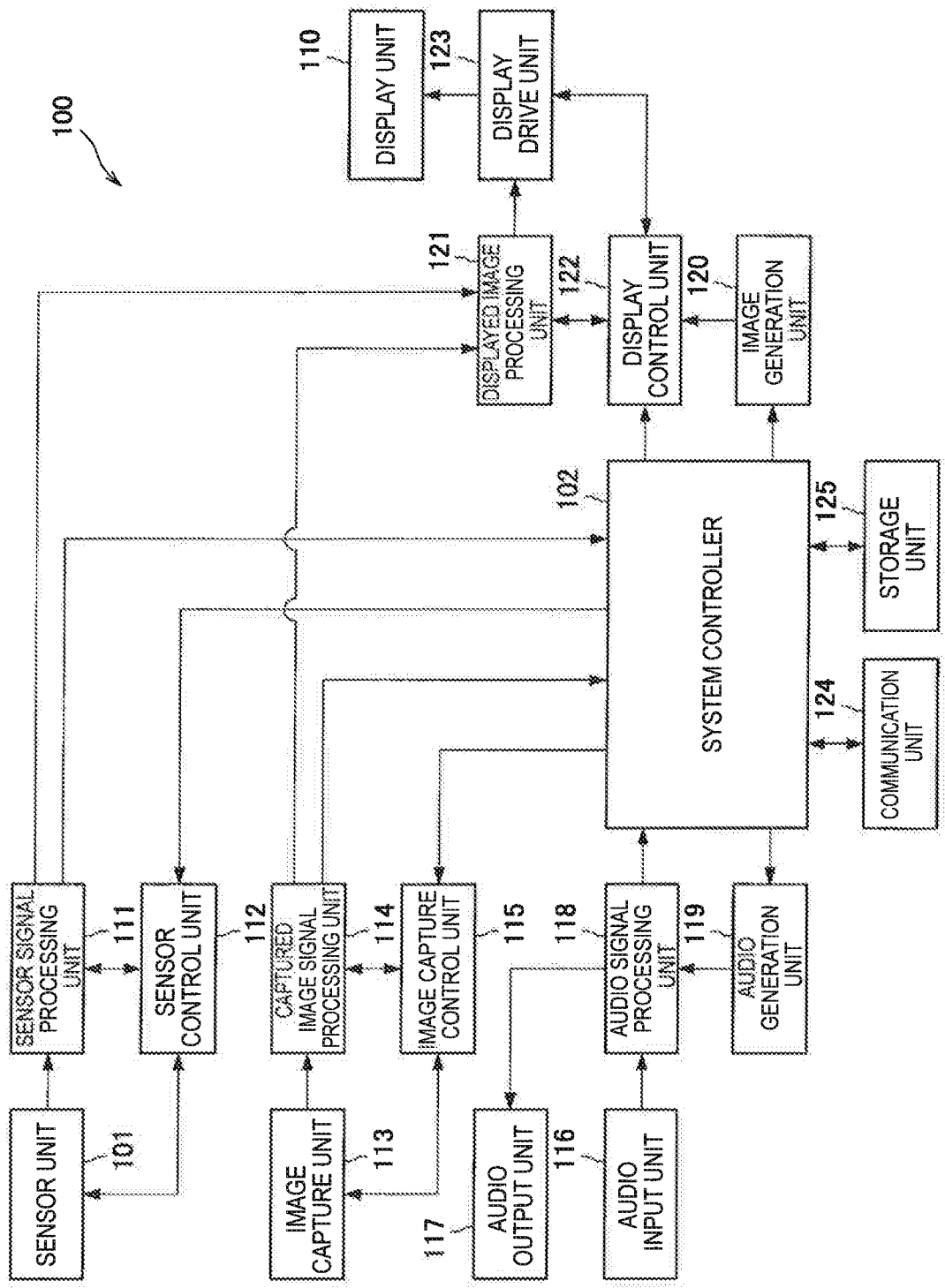
FIG. 3 is an illustrative diagram showing a functional configuration example of a head-mounted display 100 according to an embodiment of the present disclosure.

Next, a functional configuration example of a head-mounted display according to an embodiment of the present disclosure will be described. FIG. 3 is an illustrative diagram showing a functional configuration example of a head-mounted display 100 according to an embodiment of the present disclosure. The functional configuration example of the head-mounted display 100 according to an embodiment of the present disclosure will now be described with reference to FIG. 3.

As shown in FIG. 3, the head-mounted display 100 according to an embodiment of the present disclosure includes a sensor unit 101, a system controller 102, a display unit 110, a sensor signal processing unit 111, a sensor control unit 112, an image capture unit 113, a captured image signal processing unit 114, an image capture control unit 115, an audio input unit 116, an audio output unit 117, an audio signal processing unit 118, an audio generation unit 119, an image generation unit 120, a displayed image processing unit 121, a display control unit 122, a display drive unit 123, a communication unit 124, and a storage unit 125.

The system controller 102, which includes, for example, a microcomputer including a central processing unit (CPU), a read only memory (ROM), a random access memory (RAM), a non-volatile memory unit, and an interface unit, may function as a control unit which controls the entirety of this embodiment. The system controller 102 controls each unit according to an internal operating program so that a required image is displayed on the display unit 110. The system controller 102 may also function as an example of a situation acquisition unit of the present disclosure. Specifically, the system controller 102 acquires information about a situation where the head-mounted display 100 is being used, on the basis of details of signals sent from the sensor signal processing unit 111, the captured image signal processing unit 114, and the audio signal processing unit 118 (described below).

The sensor unit 101 is a sensor which is typically mounted in the vicinity of the display unit 110. The sensor unit 101, which includes, for example, an acceleration sensor, a gyroscopic sensor, a magnetic sensor, an atmospheric pressure sensor, or the like, can detect, for example, a motion of the head, a motion of the neck, a motion of the head-mounted display 100, or the like, as a signal corresponding to a motion of the user. The sensor unit 101 sends the sensor signal to the sensor signal processing unit 111.

The sensor unit 101 also processes signals from sensor systems which are used by the user to operate the head-mounted display 100, such as a capacitive sensor, buttons, a global positioning system (GPS), and the like. Note that the positions where the input devices such as the capacitive sensor, buttons. GPS, and the like are provided are not limited to a region in the vicinity of the display unit 110.

The image capture unit 113 is provided as a sensor for detecting the user's visual sensation, for example, in the vicinity of the display unit 110, to capture an image of the user's eyes. The head-mounted display 100 can perform image analysis on the image of the user's eyes captured by the image capture unit 113, to detect the user's line-of-sight direction, focal length, pupil size, or eye fundus pattern, whether the user's eyelid is open or closed, or the like. Note that the detection of the user's line-of-sight direction, focal length, pupil size, or eye fundus pattern, whether the user's eyelid is open or closed, or the like, may be performed by a light emission unit for emitting light to the user's eyes, which is provided in the vicinity of the display unit 110, and a light reception unit for receiving light reflected by the eyes. For example, the thickness of the user's crystalline lens can be detected on the basis of a light signal received by the light reception unit.

The sensor control unit 112 performs sensor control according to an instruction from the system controller 102 to determine which sensor is driven at what timing, or what drive method is used, or the like. The sensor signal processing unit 111 performs various numerical processes such as average, variance, and the like, as processes which are performed before sending a sensor signal from the sensor unit 101 to the system controller 102.

In this embodiment, the user's operation may be required in order to turn on/off power supply, start or end displaying various information images, change details of an image, adjust display such as a luminance level, a color, or the like, change a display area on a display screen, or the like. For example, in order to allow these user's operations (detection of trigger for processing operations), an operation unit provided as an operation key or operation dial which is operated by the user, and an operation detection mechanism for detecting an operation on the operation unit, are provided so that the system controller 102 can detect the user's operation, although not shown in FIG. 3. Alternatively, instead of providing such an operation unit, the system controller 102 may determine the user's intention to operate or an appropriate operation process, on the basis of the user's situation detected by the sensor unit 101 (e.g., a motion of the eye, a behavior or state of the body, etc.), and perform a process corresponding to the result of the determination.

Moreover, the head-mounted display 100 may be configured to be capable of detecting external information (detection information, such as a situation around the display device, the place, the date and time, conditions of a subject, etc.) using the sensor unit 101. The system controller 102 may determine an appropriate operation process on the basis of the external information, and perform the process.

The audio generation unit 119 performs an audio synthesis process to generate an audio signal such as a message voice or the like, or generates an audio signal such as an electronic sound or the like which is to be presented to the user, according to an instruction from the system controller 102. The audio output unit 117 has, for example, a speaker or earphone speaker (not shown) provided in the head-mounted display 100, and an amplifier circuit for the speaker. The audio signal generated by the audio generation unit 119 is supplied to the audio output unit 117, so that the user can hear a message voice, an electronic sound, or the like. Note that the audio output unit 117 may be configured as a so-called bone-conduction speaker.

The audio input unit 116, which includes a microphone amplifier unit for amplifying an audio signal obtained by a microphone and an A/D converter, outputs audio data to the audio signal processing unit 118. The audio signal processing unit 118 includes, for example, a digital signal processor, a D/A converter, and the like. Audio data obtained by the audio input unit 116 or audio data generated by the audio generation unit 119 is supplied to the audio signal processing unit 118.

The audio signal processing unit 118 performs processes such as sound volume adjustment, sound quality adjustment, sound effect, and the like on the supplied audio data under the control of the system controller 102. Thereafter, the audio signal processing unit 118 converts the processed audio data into an analog signal, and supplies the analog signal to the audio output unit 117. Note that the audio signal processing unit 118 is not limited to a configuration for performing digital signal processing, and may perform signal processing using an analog amplifier or an analog filter. The audio signal output from the audio signal processing unit 118 is output as a sound from the earphone speaker of the audio output unit 117. Such a configuration allows the user to hear external sounds collected by the audio input unit 116 or sounds generated by the audio generation unit 119.

The image generation unit 120 generates an image signal under the control of the system controller 102. The system controller 102 causes the image generation unit 120 to generate an image signal from which an image to be presented to the user is generated, on the basis of information or numerical values from the components, and thereby generates an image signal as a picture image, a graph image, a character display image, an image for warning the user, or other images. The image generation unit 120 supplies the generated image signal to the displayed image processing unit 121.

The displayed image processing unit 121, which includes, for example, a video processor, performs various display processes on the image signal supplied from the image generation unit 120. The displayed image processing unit 121 can perform luminance level adjustment, color correction, contrast adjustment, sharpness (contour emphasis) adjustment, and the like on the image signal. The displayed image processing unit 121 also adjusts settings for a display position on a display screen in the display unit 110. In addition, the displayed image processing unit 121 may be configured to be capable of performing processes, including: image effect processes, such as generation of an enlarged image by enlarging a portion of an image signal, generation of a reduced image by reducing a portion of an image signal, soft focus, mosaic, luminance reversal, highlight display (emphasized display) of a portion of an image, changing of the entire chromatic atmosphere, and the like; separation and combination of an image signal for image division display; the process of generating a character image or a picture image, and combining the generated image with an image signal supplied from the image generation unit 120; and the like. The displayed image processing unit 121 receives an image signal generated by the image generation unit 120, performs a signal process required for displaying on the image signal, and supplies the resultant signal to the display drive unit 123.

The display drive unit 123 includes a pixel drive circuit for displaying, on the display unit 110, the image signal supplied from the displayed image processing unit 121. Specifically, the display drive unit 123 applies a drive signal to pixels arranged in a matrix in the display unit 110, at respective predetermined horizontal/vertical drive timings, according to the image signal, and thereby causes the display unit 110 to display. The display drive unit 123 can also control the luminances of the pixels of the display unit 110 so that the entirety or a portion of the screen is in the see-through mode.

The display control unit 122 controls a process operation of the displayed image processing unit 121, an operation of the display drive unit 123, and an image displayed on the display unit 110 (including a process for each of the right and left display units 110R and 110L) according to an instruction from the system controller 102, and instructs the displayed image processing unit 121 to perform signal processing. The display control unit 122 also controls the display drive unit 123 so that the display drive unit 123 is switched between the see-through mode, the image display mode, and the single-eye display mode.

The image capture unit 113 includes: a lens system including an image capture lens, a diaphragm, a zoom lens, a focusing lens, and the like; a drive system for causing the lens system to perform a focusing operation or a zooming operation; a solid-state imaging element array for detecting captured image light obtained by the lens system, and performing photoelectric conversion to generate a captured image signal; and the like. Examples of the solid-state imaging element array include a charge coupled device (CCD) sensor array, and a complementary metal oxide semiconductor (CMOS) sensor array. In this embodiment, the image capture unit 113 captures an image of a scene in front of the user wearing the head-mounted display 100. Of course, the image capture unit 113 may capture an image of a scene in other directions, such as a scene behind the user or the like.

The captured image signal processing unit 114, which includes a sample hold/automatic gain control (AGC) circuit which performs gain adjustment or wave shaping on a signal obtained by the solid-state imaging element of the image capture unit 113, and a video A/D converter, obtains a captured image signal in the form of digital data. The captured image signal processing unit 114 may also perform a white balance process, a luminance process, a color signal process, a shake correction process, or the like on a captured image signal.

The image capture control unit 115 controls operations of the image capture unit 113 and the captured image signal processing unit 114 according to an instruction from the system controller 102. The image capture control unit 115 performs control to turn on/off operations of the image capture unit 113 and the captured image signal processing unit 114, for example. The image capture control unit 115 may also perform control (motor control) to cause the image capture unit 113 to perform operations such as autofocusing, automatic exposure adjustment, diaphragm adjustment, zooming, changing of the focal point, and the like. Note that when the image capture unit 113 is provided with a movable mechanism capable of changing the direction of the image capture lens toward a subject, the image capture control unit 115 may change the direction of the image capture lens in the image capture unit 113 by controlling the operation of the movable mechanism according to an instruction from the system controller 102.

The image capture control unit 115 may also include a timing generator. The image capture control unit 115 may control signal processing operations of the solid-state imaging element, and the sample hold/AGC circuit and video A/D converter of the captured image signal processing unit 114, according to a timing signal generated by the timing generator. In addition, the timing control may be used to perform variable control on the frame rate of image capture.

Moreover, the image capture control unit 115 may control the image capture sensitivity or signal processing of the solid-state imaging element and the captured image signal processing unit 114. For example, in order to control the image capture sensitivity, the image capture control unit 115 may control the gain of a signal read from the solid-state imaging element, black level settings, various coefficients for captured image signal processing in the digital data phase, a correction amount for a shake correction process, or the like. In order to control the image capture sensitivity, the image capture control unit 115 can perform a general sensitivity adjustment in which a wavelength band is not particularly taken into account, a sensitivity adjustment in which the sensitivity of image capture in a particular wavelength band, such as an infrared region, an ultraviolet region, or the like, is adjusted (e.g., image capture where the particular wavelength band is cut off), or the like. The sensitivity adjustment according to wavelength can be carried out by insertion of a wavelength filter in the image capture lens system, or a wavelength filter calculation process performed on a captured image signal. In these cases, the image capture control unit 115 can perform sensitivity control by controlling the insertion of a wavelength filter, specifying a filter calculation coefficient, or the like.

A captured image signal obtained by the image capture unit 113 and the captured image signal processing unit 114 is supplied together with an information image signal generated by the image generation unit 120 to the displayed image processing unit 121. The displayed image processing unit 121 performs the above signal processes on the captured image signal and the information image signal, and also performs a signal process for screen division (image synthesis process) on the captured image signal and the information image signal in order to simultaneously display a captured image and an information image on the display unit 110.

An image signal obtained by the synthesis process in the displayed image processing unit 121 is supplied to the display drive unit 123, and displayed on the display unit 110, so that a captured image and other images are simultaneously displayed on the display unit 110. In other words, the user can view various images while viewing an image captured by the image capture unit 113.

The user may need to perform operations for starting and ending of an image capture operation, a zooming operation, a focusing operation, a captured image adjustment, and the like. Of course, the user may also need to perform operations for turning on/off of power supply, starting and ending of displaying of various information images, changing of details of an image, display adjustment of a luminance level, a color, etc., changing of a display region on a display screen, and the like. For these operations (triggers for the operations), the head-mounted display 100 may be provided with an operation unit such as an operation key or the like. Alternatively, the system controller 102 may determine the user's intention to operate or an appropriate operation process on the basis of the user's conditions (e.g., a motion of the eye, a behavior or state of the body, etc.) detected by the sensor unit 101, and perform a process corresponding to the determination result. Moreover, the head-mounted display 100 may be configured to be capable of detecting external information (detection information, such as a situation around the display device, the place, the date and time, conditions of a subject, etc.), and the system controller 102 may determine an appropriate operation process on the basis of the external information, and perform the process.

The storage unit 125, which is a part that records and retrieves data with respect to a predetermined recording medium, is implemented as, for example, a hard disk drive (HDD) or a solid-state drive (SSD). Of course, the recording medium may be various media, such as a solid-state memory (a flash memory etc.), a memory card including a fixed memory, an optical disc, a magneto-optic disc, a hologram memory, and the like. The storage unit 125 may be adapted, according to the employed recording medium, to be capable of recording and retrieving. For example, image data as a captured image signal which has been captured by the image capture unit 113 and processed by the captured image signal processing unit 114, image data received by the communication unit 124, and various information image signals generated by the image generation unit 120 may be supplied to the storage unit 125. In addition, audio data obtained by the audio input unit 116, audio data received by the communication unit 124, and audio data generated by the audio generation unit 119 may also be supplied to the storage unit 125.

The storage unit 125 performs an encoding process on the supplied image data or audio data in order to record the data to a predetermined recording medium, and records the data to the recording medium, under the control of the system controller 102. The storage unit 125 also retrieves image data or audio data recorded in the recording medium, and outputs the data, under the control of the system controller 102. The data retrieved by the storage unit 125 may be any data that is to be displayed, such as moving image contents (movies, video clips, etc.), still image contents which are captured by a digital still camera or the like and recorded in a recording medium, data of electronic books and the like, data used on a computer (image data, text data, spreadsheet data and the like which are created by the user using a personal computer or the like), game images, and the like.

The communication unit 124 exchanges data with external devices. Examples of the external devices include an image capture device, such as a video camera, a digital still camera, and the like, which has a communication function, a computer device, a smartphone, a smartwatch, a video storage device, AV devices, such as a television set and the like, a network server device, and the like. The communication unit 124 may be configured to perform network communication, for example, through short-distance radio communication with respect to a network access point, according to a scheme such as wireless LAN, Bluetooth (registered trademark), or the like, or may be configured to perform direct radio communication with external devices having a corresponding communication function. When the external device is an image capture device, data transmitted from the external device to the head-mounted display 100 may be image data captured by the image capture device. Alternatively, when the external device is a content source device, data transmitted from the external device to the head-mounted display 100 may be any data that is to be displayed, such as moving image contents (movies, video clips, etc.), still image contents which are captured by a digital still camera or the like and recorded in a recording medium, data of electronic books and the like, data used on a computer (image data, text data, spreadsheet data and the like which are created by the user using a personal computer or the like), game images, and the like.

Audio data obtained by the audio input unit 116, audio data retrieved by the storage unit 125, and audio data received by the communication unit 124 are supplied to the audio signal processing unit 118 according to an instruction from the system controller 102. Therefore, the user can hear external sounds when an image is captured, view and hear an image and sounds retrieved by the storage unit 125, and view and hear an image and sounds received by the communication unit 124 while wearing the device. In particular, an image obtained by the image generation unit 120 is supplied together with the captured image, or retrieved image, or received image to the displayed image processing unit 121, so that various information images are displayed together with the captured image, or retrieved image, or received image on the display unit 110. Audio data generated by the audio generation unit 119 is supplied, at a timing when the audio data is generated, to the audio signal processing unit 118, so that the user can hear a message voice, a warning sound, or the like generated by the audio generation unit 119 while hearing, for example, external sounds, retrieved sounds, or received sounds.

In addition to operations of the display system and operations involved in the image capture function, the system controller 102 may determine whether to trigger operation controls for retrieval, cuing up, fast-forwarding/fast-backwarding, pausing, recording, and the like in the storage unit, and operation controls involved in transmission and reception by the communication unit. Also, in this case, an operation unit such as an operation key or the like which is operated by the user may be provided, and a process corresponding to the operation may be performed. Alternatively, the system controller 102 may determine the user's intention to operate or an appropriate operation process on the basis of the user's conditions (e.g., a motion of the eye, a behavior or state of the body, etc.) detected by the sensor unit 101, and perform a process corresponding to the determination result. Moreover, the head-mounted display 100 may be configured to be capable of detecting external information (detection information, such as a situation around the display device, the place, the date and time, conditions of a subject, etc.), and the system controller 102 may determine an appropriate operation process on the basis of the external information, and perform the process.

When the head-mounted display 100 configured as shown in FIG. 3 is operating in the image display mode or the single-eye display mode, then if there is an incoming mail, call, or the like to a device external to the head-mounted display 100 or the head-mounted display 100 itself, the system controller 102 performs a process of displaying, on the display unit 110, an image (e.g., a predetermined icon) indicating the arrival of a mail, call, or the like. In this case, the system controller 102 displays the image indicating the arrival on the display unit 110 while changing the transparency of the icon (or the luminance of the display unit 110) instead of suddenly displaying the image on the display unit 110. By thus displaying an image indicating the arrival of a mail, call, or the like on the display unit 110 while changing the transparency of the icon (or the luminance of the display unit 110), the head-mounted display 100 according to this embodiment can ensure the field of vision of the user wearing the head-mounted display 100 while keeping the user safe.

Examples of an image displayed on the display unit 110 of the head-mounted display 100 according to an embodiment of the present disclosure will be described. FIGS. 4A to 4D are illustrative diagrams showing examples of an image displayed on the display unit 110 of the head-mounted display 100 according to an embodiment of the present disclosure, where an icon is displayed when an interrupt, such as the arrival of a mail or the like, occurs. Note that FIGS. 4A to 4D show a scene which is viewed through the display unit 110 by the user of the head-mounted display 100, in addition to an image which is displayed on the display unit 110 by the head-mounted display 100.

Figure 4A:
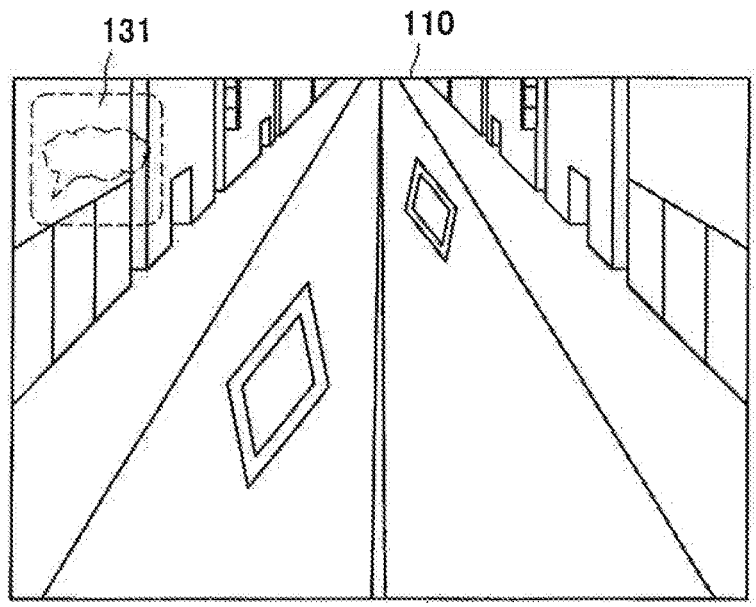
FIG. 4A is an illustrative diagram showing an example of an image which is displayed on a display unit 110 of a head-mounted display 100 according to an embodiment of the present disclosure.

FIG. 4A shows an example of an image which is displayed on the display unit 110 immediately after the occurrence of an interrupt, such as the arrival of a mail or the like. The system controller 102 displays an icon indicating the occurrence of an interrupt on the display unit 110. In this case, the system controller 102 instructs the display control unit 122 to increase the transparency of an icon 131 displayed on the display unit 110 or decrease the luminance of the display unit 110 immediately after the occurrence of an interrupt, such as the arrival of a mail or the like. In other words, the system controller 102 performs control so that the displayed icon 131 is less easily recognized immediately after the occurrence of an interrupt, such as the arrival of a mail or the like.

Figure 4B:
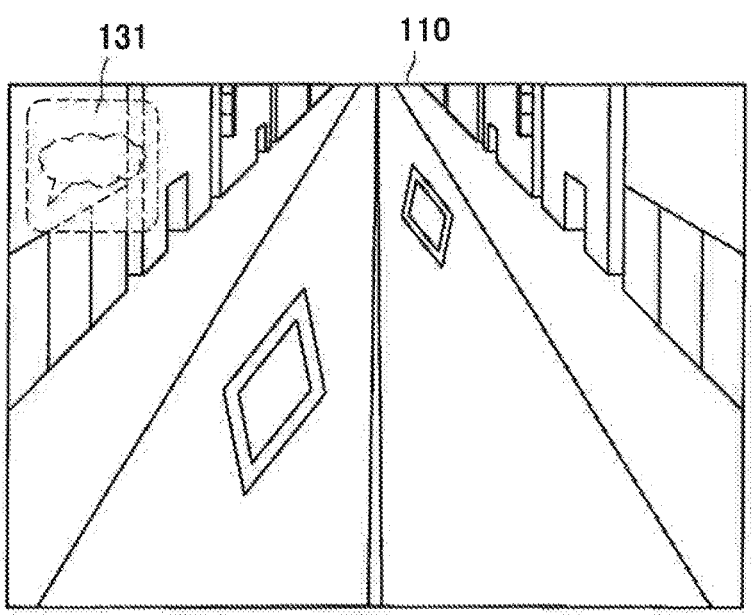
FIG. 4B is an illustrative diagram showing an example of an image which is displayed on a display unit 110 of a head-mounted display 100 according to an embodiment of the present disclosure.
Figure 4C:
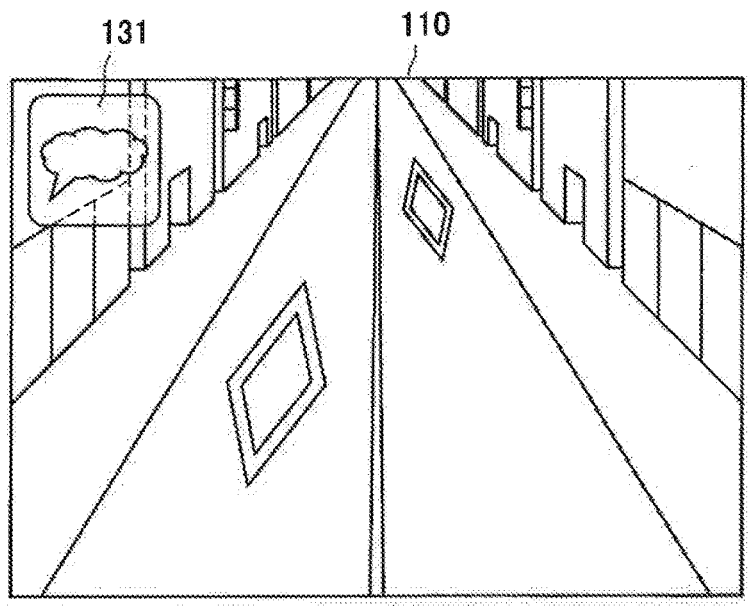
FIG. 4C is an illustrative diagram showing an example of an image which is displayed on a display unit 110 of a head-mounted display 100 according to an embodiment of the present disclosure.

FIG. 4B shows an example of an image which is displayed on the display unit 110 a predetermined period of time (e.g., 100 to 200 msec) after the state shown in FIG. 4A. FIG. 4C shows an example of an image which is displayed on the display unit 110 a predetermined period of time (e.g., 100 to 200 msec) after the state shown in FIG. 4B. As shown in FIGS. 4B and 4C, the system controller 102 instructs the display control unit 122 to gradually decrease the transparency of the icon 131 or increase the luminance of the display unit 110 so that the icon 131 can be recognized as a display.

Figure 4D:
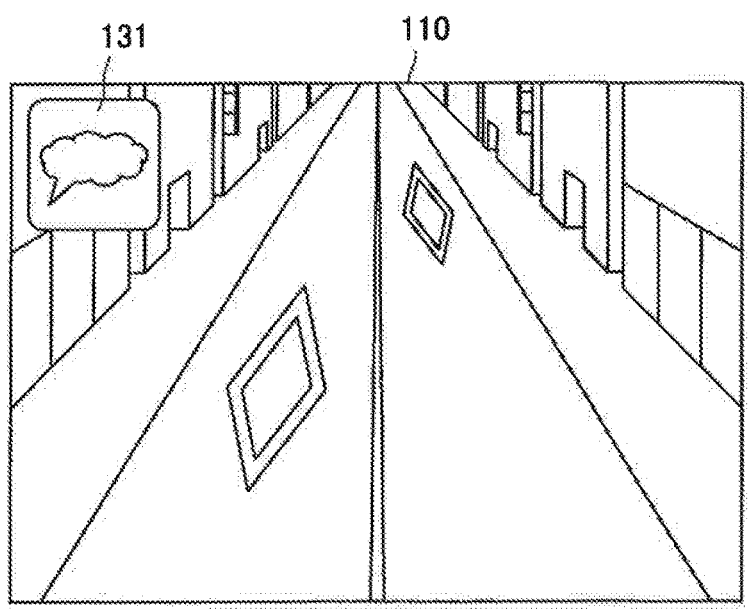
FIG. 4D is an illustrative diagram showing an example of an image which is displayed on a display unit 110 of a head-mounted display 100 according to an embodiment of the present disclosure.

FIG. 4D shows an example of an image which is displayed on the display unit 110 a predetermined period of time (e.g., 100 to 200 msec) after the state shown in FIG. 4C. As shown in FIG. 4D, the system controller 102 instructs the display control unit 122 to minimize the transparency of the icon 131 or maximize the luminance of the display unit 110 so that the icon 131 can be perfectly recognized as a display. The display control unit 122 performs control according to the instruction from the system controller 102 to minimize the transparency of the icon 131 or maximize the luminance of the display unit 110.

Figure 5:
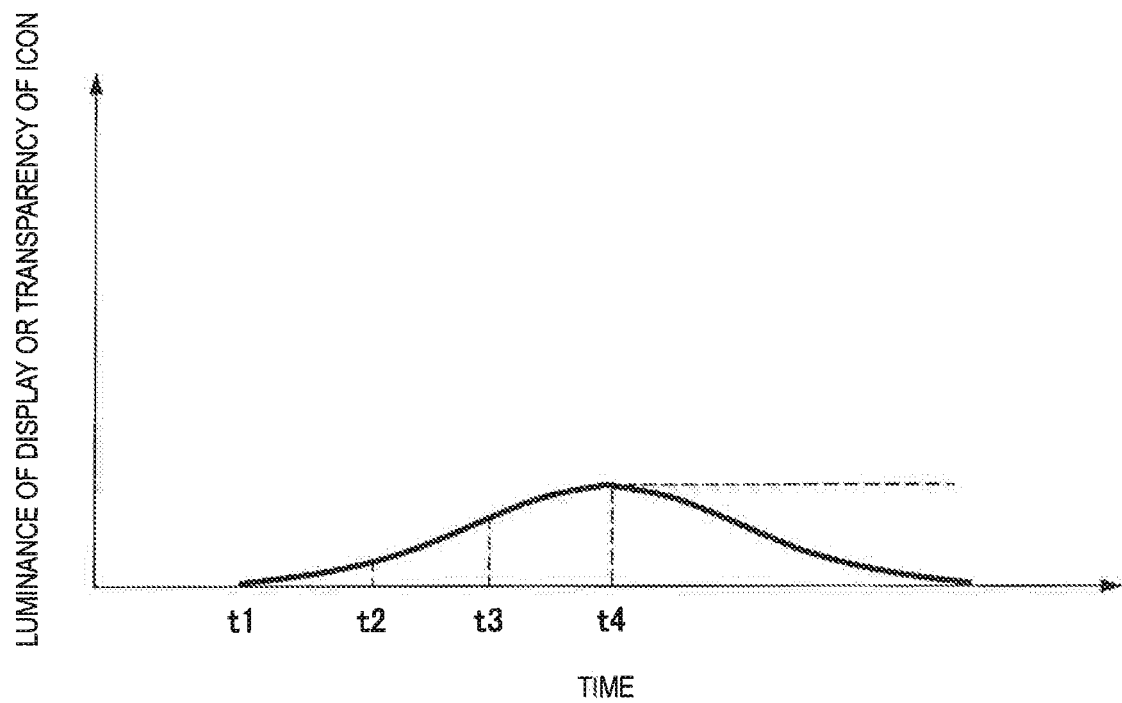
FIG. 5 is an illustrative diagram showing a graph indicating an example of changes in the transparency of an icon 131 displayed on a display unit 110 (or the luminance of the display unit 110).

FIG. 5 is an illustrative diagram showing a graph indicating an example of changes in the transparency of the icon 131 displayed on the display unit 110 (or the luminance of the display unit 110) of the head-mounted display 100 according to an embodiment of the present disclosure. In the graph shown in FIG. 5, the horizontal axis represents time, and the vertical axis represents the transparency of the icon 131 (or the luminance of the display unit 110). It is assumed that time t1 is a time point corresponding to the state shown in FIG. 4A, time t2 is a time point corresponding to the state shown in FIG. 4B, time t3 is a time point corresponding to the state shown in FIG. 4C, and time t4 is a time point corresponding to the state shown in FIG. 4D. In the head-mounted display 100 according to an embodiment of the present disclosure, the transparency of the icon 131 (or the luminance of the display unit 110) indicating the arrival of a mail, call, or the like is thus gradually changed so that the user is prevented from being involuntarily attracted by the animation.

After the icon 131 is clearly displayed at time t4, the system controller 102 may adjust the transparency of the icon 131 or the luminance of the display unit 110 so that the icon 131 is again not displayed, as indicated by a solid-state line in the graph shown in FIG. 5. Alternatively, as indicated by a dashed line in the graph shown in FIG. 5, the transparency of the icon 131 or the luminance of the display unit 110 may not be changed.

After displaying the icon 131 on the display unit 110 as shown in FIGS. 4A to 4C, the system controller 102, when receiving a second incoming mail, call, or the like, may newly display an icon 131 corresponding to the second incoming mail, call, or the like on the display unit 110 as shown in FIG. 4A to 4C, or alternatively, may erase the previously displayed icon 131 from the display unit 110, and then display an icon 131 corresponding to the second incoming mail, call, or the like on the display unit 110 as shown in FIG. 4A to 4C.

Thus, the head-mounted display 100 according to an embodiment of the present disclosure gradually display the icon 131 on the display unit 110 by changing the transparency of the icon 131 (or the luminance of the display unit 110) indicating the arrival of a mail, call, or the like over time. When only one icon 131 is displayed on the display unit 110, the system controller 102 may change either the transparency of the icon 131 or the luminance of the display unit 110. However, if two or more icons 131 are displayed on the display unit 110, then when all the icons 131 are uniformly changed, the system controller 102 may change the luminance of the display unit 110 over time, or then when only a particular icon(s) 131 is changed, the system controller 102 may change the transparency of the icon(s) 131 over time.

Note that the head-mounted display 100 according to an embodiment of the present disclosure may be capable of switching between a display process of displaying the icon 131 on the display unit 110 so that the icon 131 gradually becomes clearly visible as shown in FIGS. 4A to 4C, and a display process of clearly displaying the icon 131 on the display unit 110 from the beginning. Such switching may be set by the user or may be automatically set according to a situation where the head-mounted display 100 is used. For example, in a situation where a problem will arise if the user's field of vision is suddenly blocked, such as when the user is outside, the head-mounted display 100 may perform a display process of displaying the icon 131 on the display unit 110 so that the icon 131 gradually becomes clearly visible as shown in FIGS. 4A to 4C, according to settings provided by the user themselves or settings automatically provided by the head-mounted display 100.

The head-mounted display 100 according to an embodiment of the present disclosure may change the transparency of an image indicating the arrival of a mail, call, or the like (or the luminance of the display unit 110), according to the intensity of ambient light. Specifically, when ambient light is weak, then even if the amount of a change in the transparency of an image (or the luminance of the display unit 110) is small, the user can satisfactorily recognize the change. When ambient light is strong, it is difficult for the user to recognize such a change. Therefore, the head-mounted display 100 according to an embodiment of the present disclosure may measure the intensity of ambient light using a sensor capable of measuring the intensity of ambient light, such as a luminance sensor, a camera, or the like, in the sensor unit 101, and adjust the amount of a change in transparency or luminance according to the intensity of ambient light.

Figure 6A:
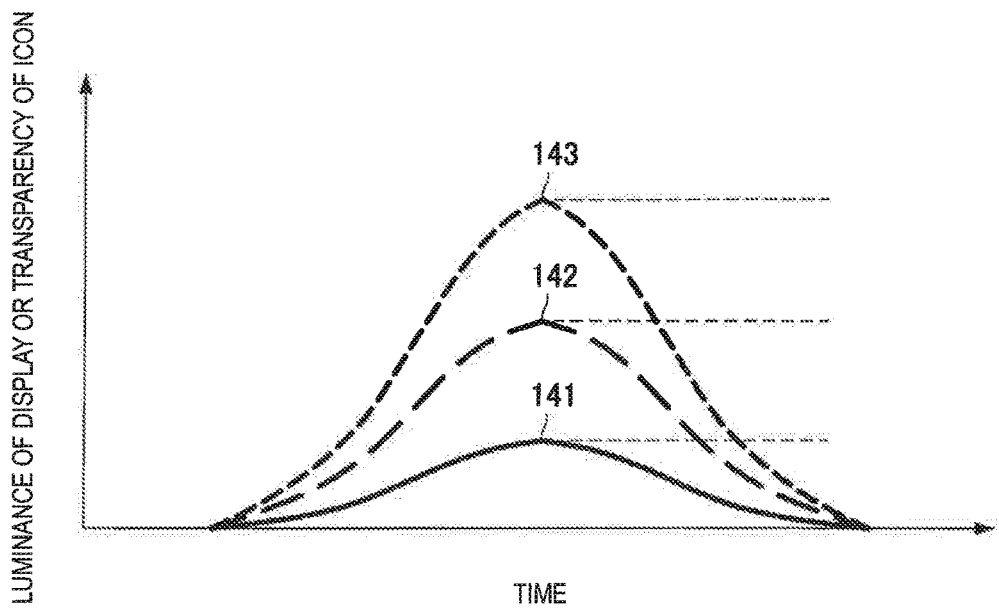
FIG. 6A is an illustrative diagram showing a graph indicating an example of changes in the transparency of an icon 131 displayed on a display unit 110 (or the luminance of the display unit 110).

FIG. 6A is an illustrative diagram showing a graph indicating an example of changes in the transparency of the icon 131 displayed on the display unit 110 (or the luminance of the display unit 110) of the head-mounted display 100 according to an embodiment of the present disclosure. In FIG. 6A, reference sign 141 indicates the transition of a display of the transparency (or the luminance of the display unit 110) when the intensity of ambient light is weak, reference sign 142 indicates the transition of a display of the transparency (or the luminance of the display unit 110) when the intensity of ambient light is stronger than in the case of reference sign 141, and reference sign 143 the transition of a display of the transparency (or the luminance of the display unit 110) when the intensity of ambient light is stronger than in the case of reference sign 142. The head-mounted display 100 according to an embodiment of the present disclosure thus gradually changes the transparency of the icon 131 (or the luminance of the display unit 110) indicating the arrival of a mail, call, or the like according to the intensity of ambient light, and thereby prevents the user from being involuntarily attracted by the animation.

Note that, as in the example shown in FIG. 5, after the icon 131 is clearly displayed, the system controller 102 may adjust the transparency of the icon 131 or the luminance of the display unit 110 so that the icon 131 is again not displayed, or alternatively, may not change the transparency of the icon 131 or the luminance of the display unit 110.

Although, in the example shown in FIG. 6A, the time it takes to fully recognize the icon 131 as a display is the same irrespective of the intensity of ambient light, the present disclosure is not limited to such an example. The head-mounted display 100 according to an embodiment of the present disclosure may perform display control so that the time it takes to fully recognize the icon 131 as a display is increased with an increase in the intensity of ambient light.

Figure 6B:
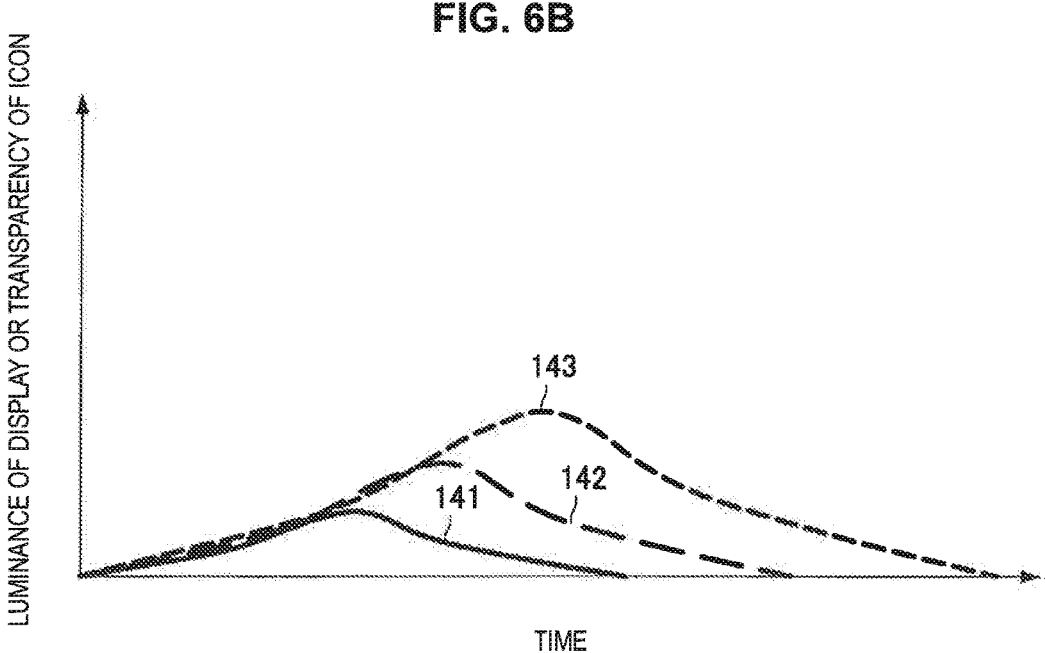
FIG. 6B is an illustrative diagram showing a graph indicating an example of changes in the transparency of an icon 131 displayed on a display unit 110 (or the luminance of the display unit 110).

FIG. 6B is an illustrative diagram showing a graph indicating an example of changes in the transparency of the icon 131 displayed on the display unit 110 (or the luminance of the display unit 110) of the head-mounted display 100 according to an embodiment of the present disclosure. FIG. 6B shows an example of changes in the transparency of the icon 131 (or the luminance of the display unit 110) in a case where the time it takes to fully recognize the icon 131 as a display is increased with an increase in the intensity of ambient light.

The above technique of changing the transparency of an icon or display information (or the luminance of the display unit 110) can be combined with a sensor value which is obtained by detecting a motion of the user's line of sight, head, or the like using the sensor unit 101. For example, if an operable icon or a message continues to be displayed in front of the eyes, a portion of the field of view is blocked, and therefore, the user is likely to feel uncomfortable. With this in mind, a display control example will be described in which display control is performed in combination with the user's line of sight so that the user is prevented from feeling uncomfortable.

Figure 7A:
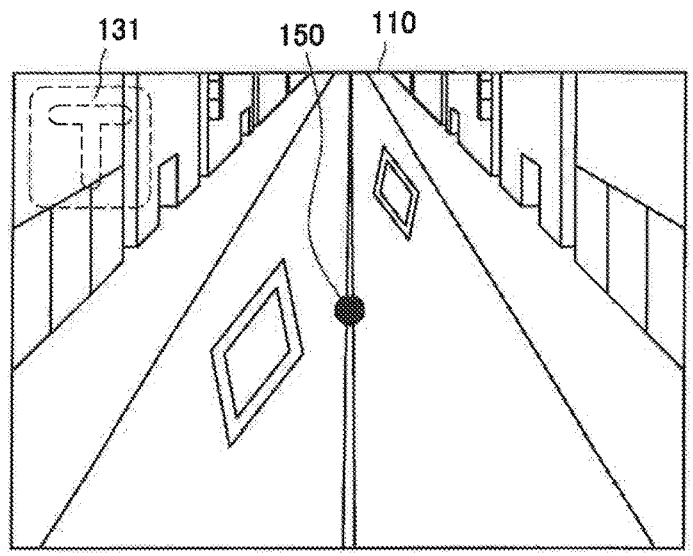
FIG. 7A is an illustrative diagram showing an example of an image which is displayed on a display unit 110 of a head-mounted display 100 according to an embodiment of the present disclosure.
Figure 7B:
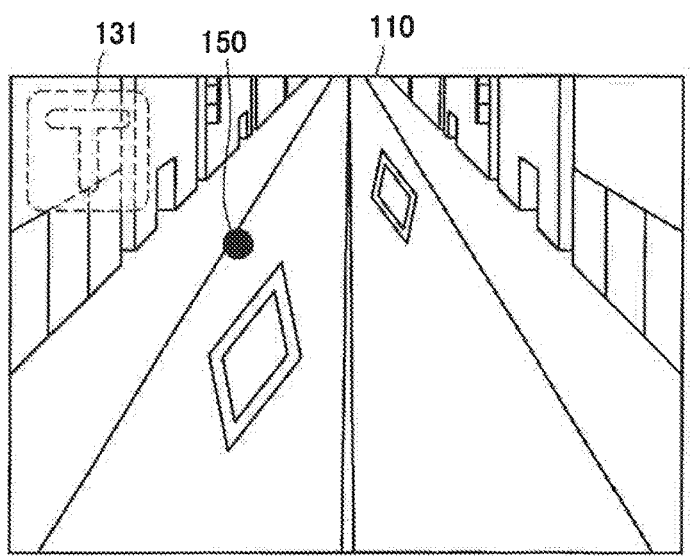
FIG. 7B is an illustrative diagram showing an example of an image which is displayed on a display unit 110 of a head-mounted display 100 according to an embodiment of the present disclosure.
Figure 7C:
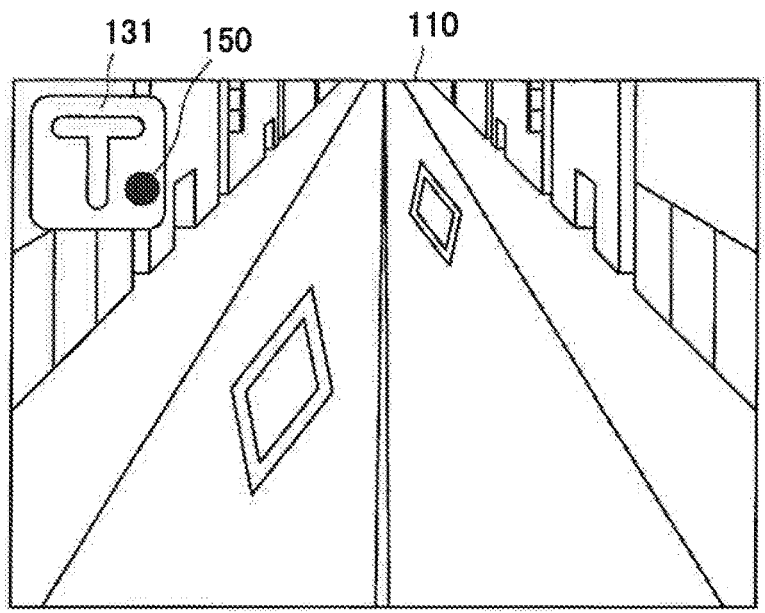
FIG. 7C is an illustrative diagram showing an example of an image which is displayed on a display unit 110 of a head-mounted display 100 according to an embodiment of the present disclosure.

FIGS. 7A to 7C are illustrative diagrams showing examples of an image displayed on the display unit 110 of the head-mounted display 100 according to an embodiment of the present disclosure, where an icon is displayed in an illustrative manner when an interrupt, such as the arrival of a mail or the like, occurs.

In FIGS. 7A to 7C, a point 150 indicates the position of the line of sight of the user wearing the head-mounted display 100. As shown in FIG. 7A, when the line of sight is located away from a region where the icon 131 is displayed, the system controller 102 instructs the display control unit 122 to cause the display unit 110 to increase the transparency of the icon 131 or decrease the luminance of the display unit 110.

As shown in FIGS. 7B and 7C, when the user's line of sight is close to the region where the icon 131 is displayed, the system controller 102 instructs the display control unit 122 to cause the display unit 110 to change the transparency of the icon 131 (or the luminance of the display unit 110) so that the icon 131 is clearly displayed instead of being transparent.

The head-mounted display 100 according to an embodiment of the present disclosure controls the display of an icon according to the place where the user's line of sight is located, so that the icon 131, which is usually not displayed in front of the eyes, is displayed on the display unit 110 only when the user wearing the head-mounted display 100 performs an operation of changing the line of sight with a thought of viewing information.

Figure 8:
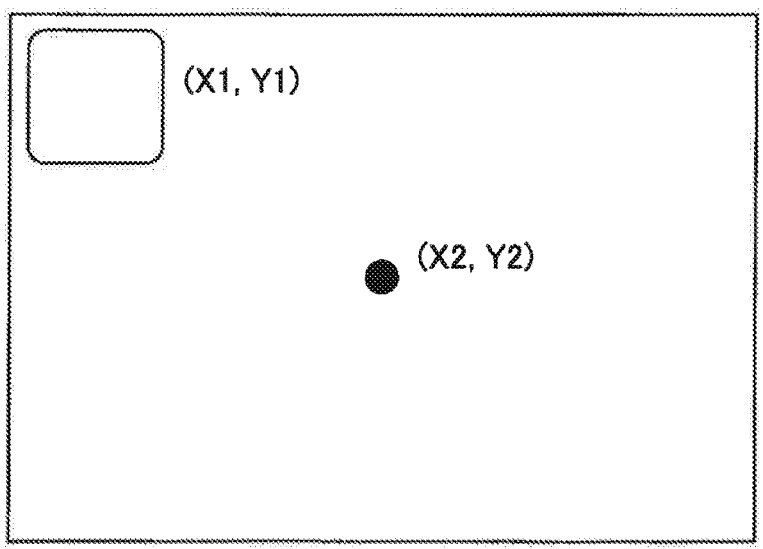
FIG. 8 is an illustrative diagram showing a specific example of a calculation method which is used during execution of display control on an icon according to the user's line of sight.

FIG. 8 is an illustrative diagram showing a specific example of a calculation method which is used during execution of display control on the icon 131 according to the user's line of sight. A coordinate point of the icon 131 in a display region is represented by (X1, Y1), and a coordinate point of the line of sight in the display region is represented by (X2, Y2). A distance A between the two points can be calculated by $A=\{(X2-X1)^2+(Y2-Y1)^2\}^{0.5}$. The system controller 102 may instruct the display control unit 122 to increase the transparency (or decreases the luminance) so that the icon 131 becomes transparent when A is great, and decrease the transparency (or increase the luminance) so that the icon 131 becomes clearly visible when A is small.

The head-mounted display 100 according to an embodiment of the present disclosure may detect an angle of the user's head using the sensor unit 101 instead of the user's line of sight, and similarly perform display control on the icon using the angle.

Figure 9A:
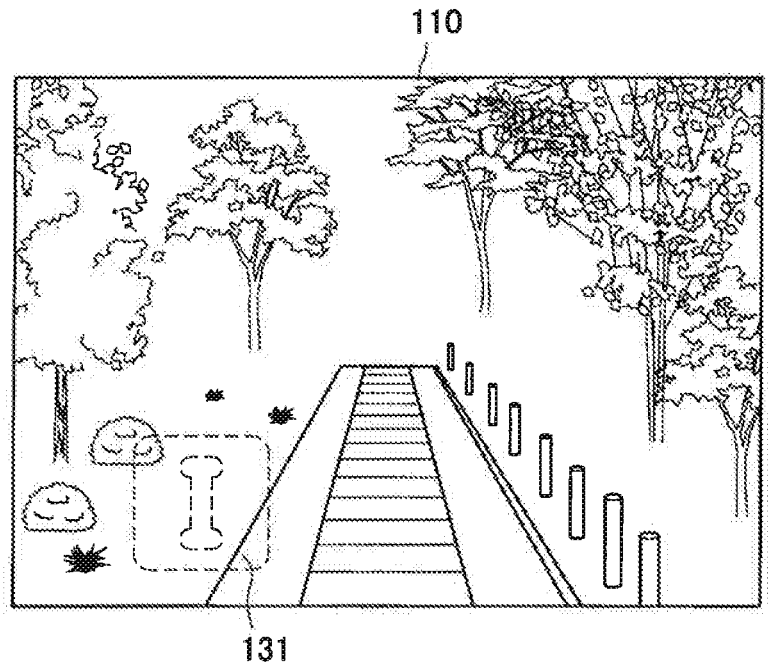
FIG. 9A is an illustrative diagram showing an example of an image which is displayed on a display unit 110 of a head-mounted display 100 according to an embodiment of the present disclosure.
Figure 9B:
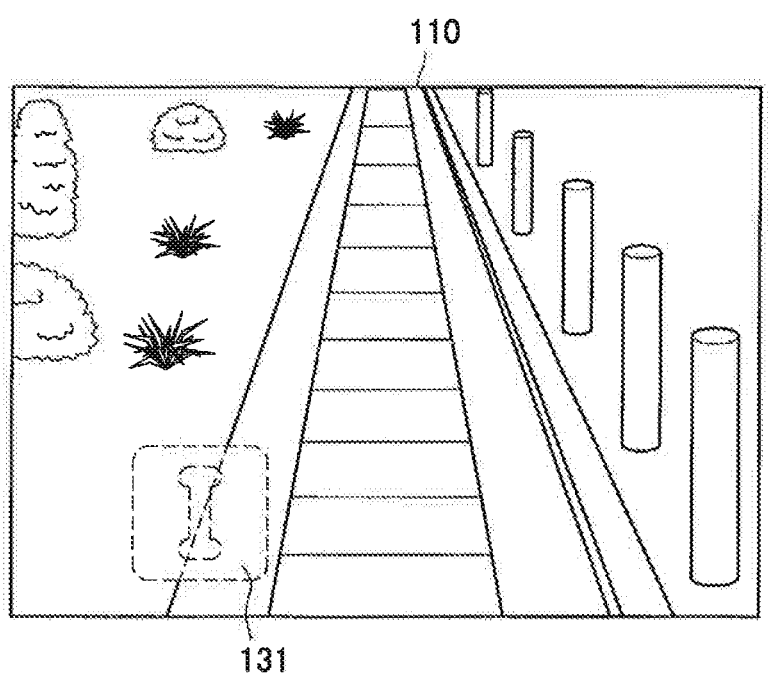
FIG. 9B is an illustrative diagram showing an example of an image which is displayed on a display unit 110 of a head-mounted display 100 according to an embodiment of the present disclosure.
Figure 9C:
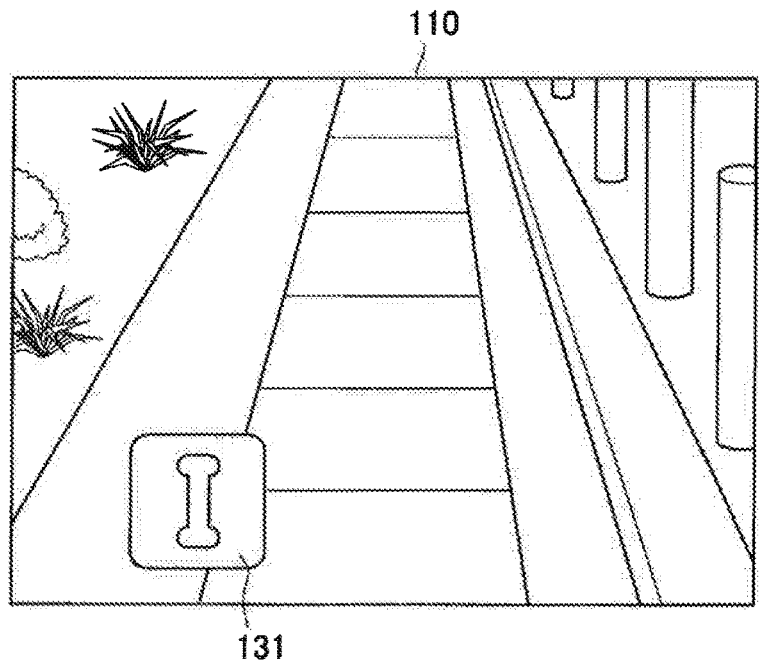
FIG. 9C is an illustrative diagram showing an example of an image which is displayed on a display unit 110 of a head-mounted display 100 according to an embodiment of the present disclosure.

FIGS. 9A to 9C are illustrative diagrams showing examples of an image displayed on the display unit 110 of the head-mounted display 100 according to an embodiment of the present disclosure, where an icon is displayed in an illustrative manner when an interrupt, such as the arrival of a mail or the like, occurs.

As shown in FIG. 9A, the system controller 102, when detecting, on the basis of data acquired by the sensor unit 101, that the user faces front without inclining their neck, instructs the display control unit 122 to cause the display unit 110 to increase the transparency of the icon 131 or decrease the luminance of the display unit 110.

As shown in FIGS. 9B and 9C, when the inclination of the user's neck gradually increases, so that the sensor unit 101 detects that the user faces their feet, on the basis of acquired data, the system controller 102 instructs the display control unit 122 to cause the display unit 110 to change the transparency of the icon 131 (or the luminance of the display unit 110) so that the icon 131 is clearly displayed instead of being transparent.

Although the head-mounted display 100 according to an embodiment of the present disclosure thus performs display control to clearly display the icon 131 according to the angle of the user's head, the present disclosure is not limited to this example. For example, the system controller 102 may perform display control to clearly display the icon 131 if the amount of a motion of the user's head exceeds a predetermined threshold.

The head-mounted display 100 according to an embodiment of the present disclosure may detect the rate of movement of the user using the sensor unit 101, and similarly perform display control on an icon using the movement rate. Specifically, when the user is walking, then if an icon is displayed on the display unit 110 to attract the user's attention, the user's attention is distracted from the scene in front of the user, which is dangerous. Therefore, the head-mounted display 100 according to an embodiment of the present disclosure may perform display control to display a thin icon when the user is walking, and a clearly visible icon when the user is standing.

When the head-mounted display 100 according to an embodiment of the present disclosure detects the rate of movement of the user, and performs display control on an icon using the movement rate, the head-mounted display 100 may perform display control to clearly display the icon if the icon is intended for emergency notification, even when the user is walking. Examples of emergency notification may include the reception of a call or the arrival of a mail from a particular person, a reminder having high priority, and the like. The user of the head-mounted display 100 may decide what is emergency notification, and emergency notification is not limited to particular things.

The head-mounted display 100 according to an embodiment of the present disclosure may detect the state of the user's activity using the image capture unit 113 or the audio input unit 116 in addition to the sensor unit 101, and perform display control on an icon to be displayed on the display unit 110, using the result of the detection of the user's activity state.

For example, when the user is driving a car while wearing the head-mounted display 100, then if it is found that the steering wheel of the car is included in an image captured by the image capture unit 113, or the sound of the engine is included in sounds collected by the audio input unit 116, the system controller 102 determines that the user is driving a car. When the user is driving a car, then if an icon is displayed on the display unit 110 to attract the user's attention, the user's attention is distracted from the scene in front of the user, which is very dangerous, as in the above case where the user is walking. Therefore, when it is found that the user is driving a car, the system controller 102 may perform display control to display a thin icon or no icon when the user is driving a car, and a clearly visible icon as described above when the car is standing.

In the head-mounted display 100 according to an embodiment of the present disclosure, if it is found that the sound of human conversation is included in sounds collected by the audio input unit 116, the system controller 102 determines that the user using the head-mounted display 100 is talking with another person. When the user using the head-mounted display 100 is talking with another person, then if an icon is displayed on the display unit 110 to attract the user's attention, the user's attention is distracted from the conversation with that person, which hinders smooth communication. Therefore, if it is found that the user is talking with another person, the system controller 102 may perform display control to display a thin icon or no icon when the user is talking, and a clearly visible icon as described above when the conversation is interrupted.

Thus, the head-mounted display 100 according to an embodiment of the present disclosure can recognize a situation where the user is using the head-mounted display 100, on the basis of an image captured by the image capture unit 113 or sounds collected by the audio input unit 116, and control the display of an icon on the display unit 110 according to the user's situation.

In the foregoing, examples have been described in which an icon is gradually displayed on the display unit 110 by changing the transparency of the icon or the luminance of the display unit 110. For example, the head-mounted display 100 according to an embodiment of the present disclosure may gradually clearly display an icon on the display unit 110 by gradually increasing the size of the icon.

In the foregoing, functional configuration examples of the head-mounted display 100 according to an embodiment of the present disclosure have been described. Next, operation examples of the head-mounted display 100 according to an embodiment of the present disclosure will be described.

[1.3. Operation Examples of Head-Mounted Display]

Figure 10:
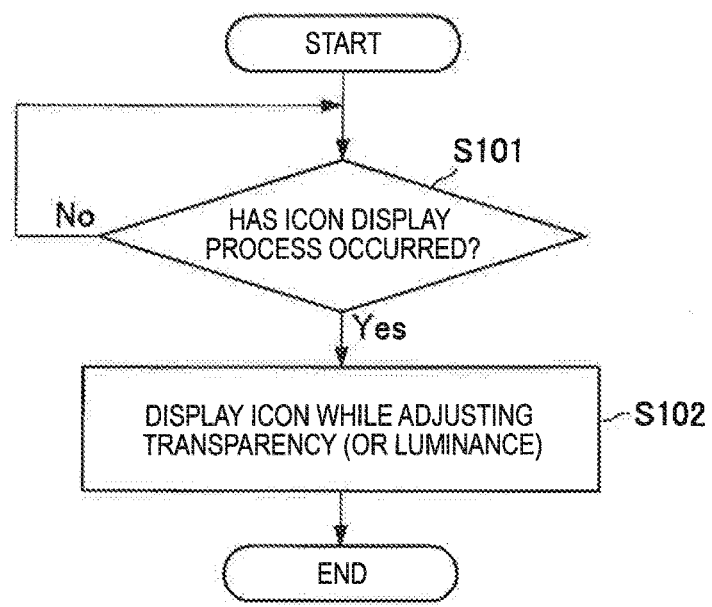
FIG. 10 is a flowchart showing an operation example of the head-mounted display 100 according to an embodiment of the present disclosure.

FIG. 10 is a flowchart showing an operation example of the head-mounted display 100 according to an embodiment of the present disclosure. FIG. 10 shows an operation example of the head-mounted display 100 which is performed when the head-mounted display 100 performs a process of displaying, on the display unit 110, an image (e.g., a predetermined icon) indicating the presence of information of which the user is to be notified, such as the arrival of a call or mail, or the like. The operation example of the head-mounted display 100 according to an embodiment of the present disclosure will now be described with reference to FIG. 10.

The head-mounted display 100 according to an embodiment of the present disclosure initially waits until the occurrence of a process of displaying, on the display unit 110, an icon indicating the presence of information of which the user is to be notified, such as the arrival of a call or mail, or the like (step S101). The head-mounted display 100, when detecting the occurrence of the process of displaying an icon on the display unit 110 (step S101: Yes), displays an icon on the display unit 110 while adjusting the transparency of the icon (or the luminance of the display unit 110) (step S102). The adjustment and display process in step S102 is, for example, performed by the display control unit 122 according to an instruction from the system controller 102.

The transparency of an icon (or the luminance of the display unit 110) may be adjusted so that, as described above, the icon may be more clearly displayed over time, the icon may be more clearly displayed according to the position of the line of sight, the icon may be more clearly displayed according to the inclination of the head, or the icon may be more clearly displayed according to the rate of movement of the user.

By thus displaying an image indicating the arrival of a mail, call, or the like on the display unit 110 while changing the transparency of an icon (or the luminance of the display unit 110), the field of vision of the user wearing the head-mounted display 100 can be ensured while the user is kept safe.

The head-mounted display 100 according to an embodiment of the present disclosure may perform display control to gradually clearly display an icon using information about color in the user's field of vision. For example, when the user using the head-mounted display 100 is in a room having white walls, the system controller 102 initially performs display control to display a white icon on the display unit 110. By initially displaying a white icon on the display unit 110 when the user using the head-mounted display 100 is in a room having white walls, the head-mounted display 100 according to an embodiment of the present disclosure can cause the user not to notice that the icon is displayed on the display unit 110.

After displaying the white icon on the display unit 110, the system controller 102 performs display control to gradually change the color of the icon to the original color, or a different color if the original color is white. By such display control, the head-mounted display 100 according to an embodiment of the present disclosure can avoid displaying information which is involuntarily noticed by the user or blocks the field of view.

Alternatively, for example, the system controller 102 initially performs display control to display, on the display unit 110, an icon having colors from which a green component is removed. Green is a color which is most strongly sensed by humans. Therefore, by displaying an icon having colors from which a green component is removed, the head-mounted display 100 according to an embodiment of the present disclosure can avoid displaying information which is involuntarily noticed by the user or blocks the field of view.

2. CONCLUSION

As described above, according to an embodiment of the present disclosure, provided is the see-through head-mounted display 100 which, when displaying information which blocks a portion of the user's field of view displays the information gradually clearly while adjusting the transparency of an icon or the luminance of the display unit 110. The head-mounted display 100 according to an embodiment of the present disclosure, when displaying information of which the user is to be notified on the display unit 110, displays the information gradually clearly while adjusting the transparency of an icon or the luminance of the display unit 110, for example, over time, according to the position of the line of sight, according to the inclination of the head, or according to the rate of movement of the user.

By thus displaying information gradually clearly while adjusting the transparency thereof or the luminance of the display unit 110, the head-mounted display 100 according to an embodiment of the present disclosure can avoid displaying information which is involuntarily noticed by the user or blocks the field of view and thereby reduce a danger to the user when the user is using the head-mounted display 100.

In the above embodiments, examples have been described in which the display control on the display unit 110 is performed by the display control unit 122 according to an instruction from the system controller 102 included in the head-mounted display 100. The present disclosure is not limited to these examples. For example, the display control on the display unit 110 may be performed by a device separated from the head-mounted display 100, which is connected to the head-mounted display 100 by wire or wirelessly.

Steps in processes executed by devices in this specification are not necessarily executed chronologically in the order described in a sequence chart or a flow chart. For example, step S in processes executed by devices may be executed in a different order from the order described in a flow chart or may be executed in parallel.

Further, a computer program can be created which causes hardware such as a CPU, ROM, or RAM, incorporated in each of the devices, to function in a manner similar to that of structures in the above-described devices. Furthermore, it is possible to provide a recording medium having the computer program recorded thereon. Moreover, by configuring respective functional blocks shown in a functional block diagram as hardware, the hardware can achieve a series of processes.

Note that software which is used to implement the user interface or application described in the above embodiments may be implemented as a web application which is used through a network, such as the Internet or the like. The web application may be implemented using, for example, a markup language, such as HyperText Markup Language (HTML), Standard Generalized Markup Language (SGML), Extensible Markup Language (XML), or the like.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the technology of the present disclosure may also be configured as below.

(1)

A display control device including:

a situation acquisition unit configured to acquire information about a situation where a see-through display worn on a user in front of the user's eye is being used; and a display control unit configured to perform display control on the see-through display using the information acquired by the situation acquisition unit so that a display of the information on the see-through display gradually becomes clearly visible.

(2)

The display control device according to (1), wherein the situation acquisition unit acquires a state of ambient light, and wherein the display control unit performs display control so that the display of the information on the see-through display gradually becomes clearly visible according to the state of the ambient light.

(3)

The display control device according to (2), wherein the display control unit performs display control so that the time it takes for the display of the information on the see-through display to become clearly visible increases with an increase in an intensity of the ambient light.

(4)

The display control device according to (1), wherein the situation acquisition unit acquires a state of a line of sight of the user viewing the see-through display, and wherein the display control unit performs display control so that the display of the information on the see-through display gradually becomes clearly visible according to the state of the line of sight.

(5)

The display control device according to (1), wherein the situation acquisition unit acquires a state of a motion of a head of the user viewing the see-through display, and wherein the display control unit performs display control so that the display of the information on the see-through display gradually becomes clearly visible according to the state of the motion of the head.

(6)

The display control device according to (1), wherein the situation acquisition unit acquires a state of an inclination of a head of the user viewing the see-through display, and wherein the display control unit performs display control so that the display of the information on the see-through display gradually becomes clearly visible according to a degree of the inclination of the head.

(7)

The display control device according to (1), wherein the situation acquisition unit acquires a state of an activity of the user viewing the see-through display, and wherein the display control unit performs display control so that the display of the information on the see-through display gradually becomes clearly visible according to the state of the activity.

(8)

The display control device according to (1), wherein the situation acquisition unit acquires a background at which a line of sight of the user viewing the see-through display is aimed, and wherein the display control unit performs display control so that the display of the information on the see-through display gradually becomes clearly visible according to a state of the background.

(9)

The display control device according to (8), wherein the display control unit performs display control so that the display of the information on the see-through display gradually becomes clearly visible according to a color of the background.

(10)

The display control device according to (1), wherein the display control unit performs display control to change a transparency of the display of the information on the see-through display so that the display of the information on the see-through display gradually becomes clearly visible.

(11)

The display control device according to (1), wherein the display control unit performs display control to change a luminance of the see-through display so that the display of the information on the see-through display gradually becomes clearly visible.

(12)

A display control method including:

acquiring information about a situation where a see-through display is being used, and performing display control on the see-through display using the acquired information so that a display of the information on the see-through display gradually becomes clearly visible.

(13)

A computer program for causing a computer to execute:

acquiring information about a situation where a see-through display is being used; and performing display control on the see-through display using the acquired information so that a display of the information on the see-through display gradually becomes clearly visible.

REFERENCE SIGNS LIST 100 head-mounted display
101 sensor unit
102 system controller
110 display unit
111 sensor signal processing unit
112 sensor control unit
113 image capture unit
114 captured image signal processing unit
115 image capture control unit
116 audio input unit
117 audio output unit
118 audio signal processing unit
119 audio generation unit
120 image generation unit
121 displayed image processing unit
122 display control unit
123 display drive unit
124 communication unit
125 storage unit
131 icon

The invention claimed is:

1. A display control device comprising:
at least one processor configured to:
acquire notification information to notify a user of a see-through head mounted display of an arrival of at least one of a mail or a call; and
control, based on the notification information, the see-through head mounted display to:
initiate display of an icon image indicating the notification information, and after initiating the display of the icon image, gradually increase visibility of the icon image.

2. The display control device according to claim 1, wherein the at least one processor is further configured to:
determine whether the user is outside;
control, based on the notification information and determination that the user is not outside, the see-through head mounted display to initiate the display of the icon image at a first visibility; and
control, based on the notification information and determination that the user is outside, the see-through head mounted display to initiate the display of the icon image at a second visibility lower than the first visibility.

3. The display control device according to claim 1, wherein the at least one processor is further configured to:
acquire ambient information of an intensity of ambient light; and
control, based on the ambient information, the see-through head mounted display to:
increase the visibility of the icon image as the intensity of the ambient light increases, and
increase a time it takes to finish increasing the visibility of the icon image as the intensity of the ambient light increases.

4. The display control device according to claim 1, wherein the at least one processor is further configured to:
determine whether a state of the user is a movement state or a non-movement state based on a rate of movement of the user;
control, based on the notification information and determination that the state of the user is the non-movement state, the see-through head mounted display to display the icon image at a third visibility; and
control, based on the notification information and determination that the state of the user is the movement state, the see-through head mounted display to display the display of the icon image at a fourth visibility lower than the third visibility.

5. The display control device according to claim 4, wherein the movement state is a walking state, and wherein the non-movement state is a standing state.

6. The display control device according to claim 1, wherein the at least one processor is further configured to:
control, based on the notification information, the see-through head mounted display to:
after initiating the display of the icon image, gradually decrease a transparency of the icon image.

7. The display control device according to claim 1, wherein the at least one processor is further configured to:
control, based on the notification information, the see-through head mounted display to:
after initiating the display of the icon image, gradually increase a luminance of the see-through head mounted display.

8. The display control device according to claim 1, wherein the at least one processor is further configured to:
control, based on the notification information, the see-through head mounted display to:
after the increase of the visibility of the icon image is finished, gradually decrease the visibility of the icon image.

9. The display control device according to claim 1, wherein the at least one processor is further configured to:
control the see-through head mounted display to:
gradually increase the visibility of the icon image according to a state of a line of sight of the user viewing the see-through head mounted display.

10. The display control device according to claim 9, wherein the at least one processor is further configured to:
control, when the line of sight of the user is within a predetermined distance to a region where the icon image is displayed, the see-through head mounted display to:
change a transparency of the icon image so that the increase of the visibility of the icon image is finished.

11. The display control device according to claim 1, wherein the at least one processor is further configured to:
control the see-through head mounted display to:
gradually increase the visibility of the icon image according to a degree of an inclination of a head of the user viewing the see-through head mounted display.

12. The display control device according to claim 1, wherein the at least one processor is further configured to:
change the visibility of the icon image by decreasing a green component of the icon image than other color components of the icon image.

13. The display control device according to claim 1, wherein the at least one processor is further configured to:
determine a state of an activity of the user viewing the see-through display; and
control the see-through head mounted display to:
gradually increase the visibility of the icon image according to the state of the activity.

14. The display control device according to claim 1, wherein the at least one processor is further configured to:
determine a background at which a line of sight of the user viewing the see-through display is aimed; and
control the see-through head mounted display to:
gradually increase the visibility of the icon image according to a state of the background.

15. A display control method comprising:
acquiring notification information to notify a user of a see-through head mounted display of an arrival of at least one of a mail or a call; and
controlling, based on the notification information, the see-through head mounted display to:
display an icon image indicating the notification information; and
after displaying of the icon image, gradually increase visibility of the icon image.

16. A non-transitory computer-readable storage medium having embodied thereon a program, which when executed by a computer causes the computer to execute a method, the method comprising:
acquiring notification information to notify a user of a see-through head mounted display of an arrival of at least one of a mail or a call; and
controlling, based on the notification information, the see-through head mounted display to:
display an icon image indicating the notification information; and
after displaying of the icon image, gradually increase visibility of the icon image.

* * * * *